US009958838B2

(12) United States Patent
Zacharko et al.

(10) Patent No.: US 9,958,838 B2
(45) Date of Patent: May 1, 2018

(54) OPTIMIZING POWER DELIVERED TO AN ELECTRICAL ACTUATOR

(71) Applicant: Halliburton Energy Services, Inc., Houston, TX (US)

(72) Inventors: Jonathan Peter Zacharko, Spring, TX (US); David Yan Lap Wong, Humble, TX (US); Clint Paul Lozinsky, Kingwood, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 469 days.

(21) Appl. No.: 14/522,166

(22) Filed: Oct. 23, 2014

(65) Prior Publication Data
US 2016/0116889 A1 Apr. 28, 2016

(51) Int. Cl.
| H01H 35/00 | (2006.01) |
| H01H 83/00 | (2006.01) |
| G05B 13/02 | (2006.01) |
| E21B 41/00 | (2006.01) |
| G05B 19/02 | (2006.01) |
| E21B 23/00 | (2006.01) |

(52) U.S. Cl.
CPC .......... G05B 13/0205 (2013.01); E21B 23/00 (2013.01); E21B 41/00 (2013.01); E21B 41/0085 (2013.01); G05B 19/02 (2013.01)

(58) Field of Classification Search
CPC ...... E21B 41/00; E21B 23/00; E21B 41/0085; G05B 13/0205; G05B 19/02
See application file for complete search history.

(56) References Cited

U.S. PATENT DOCUMENTS

| 4,417,312 | A | | 11/1983 | Cronin et al. ............... 700/282 |
| 5,161,083 | A | | 11/1992 | Mohler et al. ............... 361/143 |
| 5,550,449 | A | * | 8/1996 | Ege ........................ G05B 24/02 |
| | | | | 318/601 |
| 5,857,530 | A | | 1/1999 | Gronseth ...................... 175/45 |
| 5,914,849 | A | | 6/1999 | Perreira ...................... 361/187 |
| 6,407,522 | B1 | | 6/2002 | Andersson et al. .......... 318/430 |
| 6,686,831 | B2 | | 2/2004 | Cook et al. .................. 323/273 |

(Continued)

FOREIGN PATENT DOCUMENTS

| KR | 20030059426 | 7/2003 | ............ F04D 27/00 |
| WO | WO 2005/036296 | 4/2005 | ............ H02M 3/158 |
| WO | 2012-121902 | 9/2012 | |

OTHER PUBLICATIONS

International Search Report and Written Opinion, Application No. PCT/US2015/051125; 10 pgs, dated Dec. 31, 15.

*Primary Examiner* — Jared Fureman
*Assistant Examiner* — Esayas Yeshaw
(74) *Attorney, Agent, or Firm* — Baker Botts L.L.P.

(57) ABSTRACT

A method for controlling an electrical actuator is disclosed. The method may include driving an electrical actuator at a power level during each of a plurality of actuation attempts and determining whether the electrical actuator actuated during each of the plurality of actuation attempts. The method may also include counting a number of failed actuation attempts, counting a number of successful actuation attempts. In addition, the method may include adjusting the power level based on at least one of the number of failed actuation attempts and the number of successful actuation attempts, and driving the electrical actuator at an adjusted power level.

17 Claims, 3 Drawing Sheets

(56) References Cited

U.S. PATENT DOCUMENTS

| | | | |
|---|---|---|---|
| 7,021,072 B2 | 4/2006 | McMillan et al. | 62/186 |
| 7,884,566 B2 | 2/2011 | Abel et al. | 318/609 |
| 8,064,158 B1 | 11/2011 | Carter et al. | 360/78.12 |
| 8,219,289 B2* | 7/2012 | Kamada | B60T 1/005 192/220.2 |
| 9,580,934 B2* | 2/2017 | Baty | E05B 47/0012 |
| 2003/0222607 A1 | 12/2003 | Simizu et al. | |
| 2004/0028476 A1 | 2/2004 | Payne et al. | 405/184 |
| 2004/0172184 A1* | 9/2004 | Vukovich | B60W 10/02 701/51 |
| 2005/0168891 A1* | 8/2005 | Nilman-Johansson | H01H 11/0062 361/23 |
| 2005/0256617 A1* | 11/2005 | Cawthorne | B60W 10/08 701/22 |
| 2006/0016201 A1 | 1/2006 | Kopel | 62/129 |
| 2006/0036402 A1* | 2/2006 | Deller | F15B 19/005 702/183 |
| 2008/0061633 A1* | 3/2008 | Blair | H05B 37/0281 307/141 |
| 2008/0086579 A1* | 4/2008 | Williams | G05B 19/0423 710/61 |
| 2008/0204948 A1* | 8/2008 | Zhang | B66C 1/08 361/144 |
| 2008/0269922 A1 | 10/2008 | Tesar | 700/49 |
| 2010/0284119 A1 | 11/2010 | Coakley et al. | 361/140 |
| 2011/0146287 A1* | 6/2011 | Nelson | F02C 9/00 60/772 |
| 2011/0259600 A1 | 10/2011 | Segura et al. | 166/374 |
| 2012/0038294 A1 | 2/2012 | Schulz et al. | 318/8 |
| 2013/0119910 A1 | 5/2013 | Marvin et al. | |
| 2013/0248203 A1 | 9/2013 | Scott et al. | 166/373 |
| 2013/0307447 A1 | 11/2013 | Rozman et al. | 318/400.02 |
| 2014/0103846 A1* | 4/2014 | Fingleton | H02P 23/22 318/432 |
| 2014/0105428 A1* | 4/2014 | Zoellin | H04R 23/00 381/174 |
| 2014/0158426 A1 | 6/2014 | Hay et al. | |
| 2014/0265619 A1* | 9/2014 | Chau | H02J 17/00 307/104 |

* cited by examiner

OPTIMIZING POWER DELIVERED TO AN ELECTRICAL ACTUATOR

TECHNICAL FIELD

The present disclosure relates generally to downhole drilling tools and, more particularly, to controlling the power delivered to an electrical actuator in a downhole drilling tool.

BACKGROUND

Various types of tools are used to form wellbores in subterranean formations for recovering hydrocarbons such as oil and gas lying beneath the surface. Examples of such tools include rotary drill bits. A downhole drilling assembly may include a drill string, an electrically actuated clutch assembly, and a drive shaft coupled to a drill bit. The electrically actuated clutch assembly may receive electrical power from a battery located downhole. When electrically actuated, the clutch assembly may convert mechanical power from rotating components within the drill string into steering power. The steering power may flex the drive shaft and thus steer the drill bit in a desired direction.

BRIEF DESCRIPTION OF THE DRAWINGS

For a more complete understanding of the present disclosure and its features and advantages, reference is now made to the following description, taken in conjunction with the accompanying drawings, in which.

DETAILED DESCRIPTION

A system for controlling the power to an electrical actuator, such as an electrically actuated clutch in a downhole drilling assembly, is disclosed. The system optimizes the power that may be delivered to the electrical actuator in order to minimize the total energy used by the electrical actuator. Accordingly, the life of a battery configured to supply energy to the electrical actuator may be extended. The system may also adapt to changing conditions over time. For example, the amount of power that may be required to drive an electrical actuator such as an electrically actuated clutch may change over time due to factors such as wear and/or environmental conditions such as temperature and ambient pressure. The system may calibrate itself over time such that the energy supplied to the electrical actuator remains optimized for the given conditions.

Figure 1:
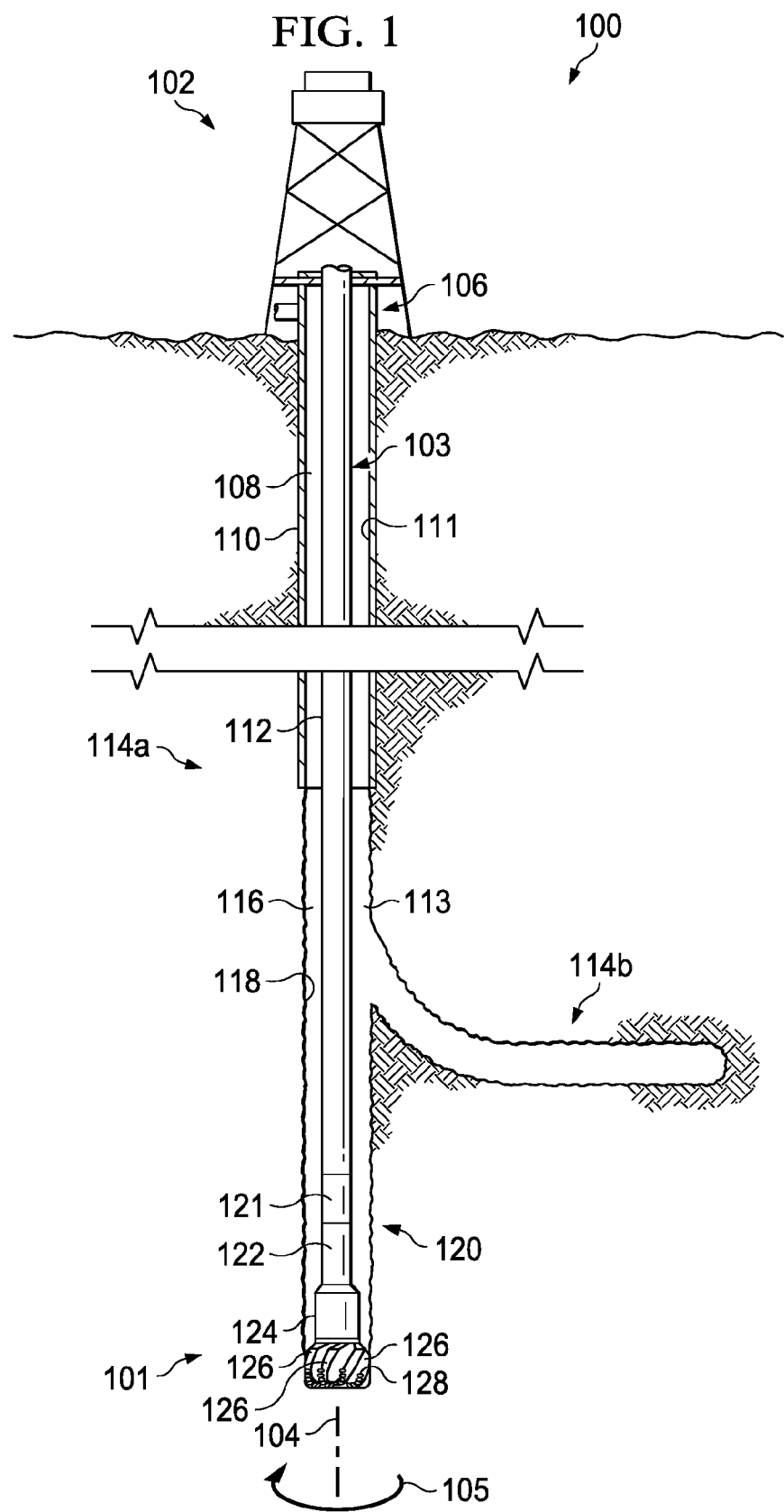
FIG. 1 illustrates an elevation view of an example embodiment of a drilling system.

FIG. 1 illustrates an elevation view of an example embodiment of drilling system 100. Drilling system 100 may include well surface or well site 106. Various types of drilling equipment such as a rotary table, drilling fluid pumps and drilling fluid tanks (not expressly shown) may be located at well surface or well site 106. For example, well site 106 may include drilling rig 102 that may have various characteristics and features associated with a "land drilling rig." However, downhole drilling tools incorporating teachings of the present disclosure may be satisfactorily used with drilling equipment located on offshore platforms, drill ships, semi-submersibles and drilling barges (not expressly shown).

Drilling system 100 may also include drill string 103 associated with drill bit 101 that may be used to form a wide variety of wellbores or bore holes such as generally vertical wellbore 114a or generally horizontal wellbore 114b or any combination thereof. Various directional drilling techniques and associated components of bottom hole assembly (BHA) 120 of drill string 103 may be used to form horizontal wellbore 114b. For example, lateral forces may be applied to BHA 120 proximate kickoff location 113 to form generally horizontal wellbore 114b extending from generally vertical wellbore 114a. The term "directional drilling" may be used to describe drilling a wellbore or portions of a wellbore that extend at a desired angle or angles relative to vertical. The desired angles may be greater than normal variations associated with vertical wellbores. Direction drilling may also be described as drilling a wellbore deviated from vertical. The term "horizontal drilling" may be used to include drilling in a direction approximately ninety degrees (90°) from vertical.

BHA 120 may be formed from a wide variety of components configured to form wellbore 114. For example, components within BHA 120 may include, but are not limited to, drill bits (e.g., drill bit 101), coring bits, drill collars, rotary steering tools, directional drilling tools, downhole drilling motors, reamers, hole enlargers or stabilizers. The number and types of components included in BHA 120 may depend on anticipated downhole drilling conditions and the type of wellbore that may be formed by drill string 103 and rotary drill bit 101. BHA 120 may also include various types of well logging tools (not expressly shown) and other downhole tools associated with directional drilling of a wellbore. Examples of logging tools and/or directional drilling tools may include, but are not limited to, acoustic, neutron, gamma ray, density, photoelectric, nuclear magnetic resonance, rotary steering tools and/or any other commercially available well tools.

Wellbore 114 may be defined in part by casing string 110 that may extend from well surface 106 to a selected downhole location. Portions of wellbore 114, as shown in FIG. 1, that do not include casing string 110 may be described as "open hole." Various types of drilling fluid may be pumped from well surface 106 through drill string 103 to attached drill bit 101. The drilling fluids may be directed to flow from drill string 103 to respective nozzles (depicted as nozzles 156 in FIG. 2) passing through rotary drill bit 101. The drilling fluid may be circulated back to well surface 106 through annulus 108 defined in part by outside diameter 112 of drill string 103 and inside diameter 118 of wellbore 114a. Inside diameter 118 may be referred to as the "sidewall" of wellbore 114a. Annulus 108 may also be defined by outside diameter 112 of drill string 103 and inside diameter 111 of casing string 110. Open hole annulus 116 may be defined as sidewall 118 and outside diameter 112.

Drilling system 100 may also include rotary drill bit ("drill bit") 101. Drill bit 101, may include one or more blades 126 that may be disposed outwardly from exterior portions of rotary bit body 124 of drill bit 101. Blades 126 may be any suitable type of projections extending outwardly from rotary bit body 124. Drill bit 101 may rotate with respect to bit rotational axis 104 in a direction defined by directional arrow 105. Blades 126 may include one or more cutting elements 128 disposed outwardly from exterior portions of each blade 126. Blades 126 may also include one or more depth of cut controllers (not expressly shown) configured to control the depth of cut of cutting elements 128. Blades 126 may further include one or more gage pads (not expressly shown) disposed on blades 126. Drill bit 101 may have many different designs, configurations, and/or dimensions according to the particular application of drill bit 101.

During drilling operations, drill string 103 may provide torque to drill bit 101. For example, BHA 120 may include electrically actuated clutch assembly 121 and drive-shaft housing 122. When actuated, electrically actuated clutch assembly 121 may convert mechanical power from rotating components within drill string 103 into steering power. The steering power may flex drive shaft housing 122 and thus steer drill bit 101 in a desired direction.

Figure 2:
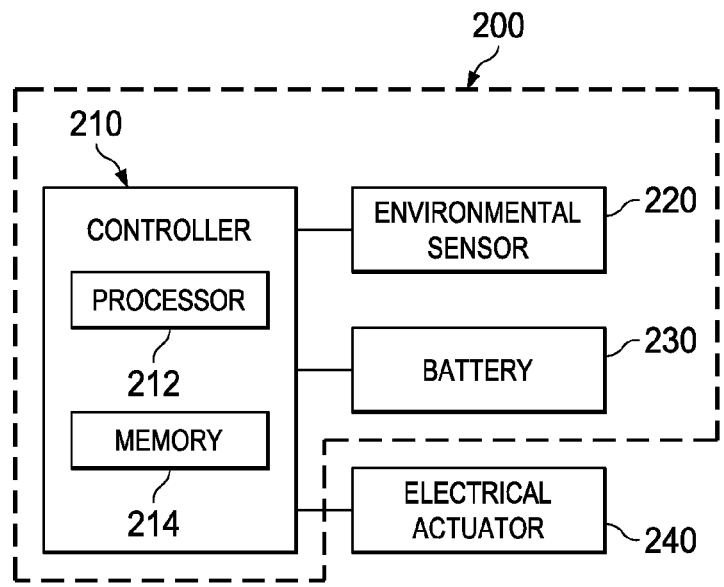
FIG. 2 illustrates a block diagram of a system for controlling an electrical actuator.

FIG. 2 illustrates a block diagram of control system 200 for controlling electrical actuator 240. Control system 200 may include controller 210, environmental sensor 220, battery 230, and may be configured to control electrical actuator 240. Electrical actuator 240 may be an electrically actuated clutch assembly (e.g., electrically actuated clutch assembly 121), or any other electrically actuated downhole device such as a solenoid, a motor, or another electrically actuated clutch. For example, electrical actuator 240 may be an electric motor for guiding drill bit 101 in directional drilling applications. In addition, control system 200 may be utilized to control electrical actuator 240 in any suitable application (e.g., drilling applications or wireline logging applications).

Electrical actuator 240 may be located downhole. Control system 200 may also be located downhole and may be configured to optimize power delivered to electrical actuator 240. For example, control system 200, including battery 230, may be located downhole at a position proximate to or near the position of downhole actuator 240. By minimizing the total energy from battery 230 that is consumed by electrical actuator 240, control system 200 may extend the service life of battery 230. Accordingly, control system 200 may reduce the cost associated with servicing (e.g., recharging or replacing) battery 230 in the downhole environment.

Controller 210 may include processor 212 and memory 214. Processor 212 may interact with instructions stored in memory 214. As described in further detail below with reference to FIG. 3, instructions stored in memory 214 may include instructions for determining how much power to deliver from battery 230 to electrical actuator 240 in order to actuate electrical actuator 240.

Processor 212 may also receive inputs from environmental sensor 220, which may sense one or more environmental conditions that may affect the amount of energy that may be required to successfully actuate electrical actuator 240. For example, processor 212 may receive an input from environmental sensor 220 indicative of the temperature. The magnetic field in an electrically actuated clutch may be proportional to the current driven through the electrically actuated clutch. Further, the resistance of the electrically actuated clutch may increase with temperature. Thus, more power may be needed at higher temperatures to achieve the requisite drive current to actuate the electrically actuated clutch.

Processor 212 may include, for example, a microprocessor, microcontroller, digital signal processor (DSP), application specific integrated circuit (ASIC), or any other digital or analog circuitry configured to interpret and/or execute program instructions and/or process data. In some embodiments, processor 212 may interpret and/or execute program instructions and/or process data stored in memory 214. Memory 214 may be configured in part or whole as application memory, system memory, or both. Memory 214 may store any system, device, or apparatus configured to hold and/or house one or more memory modules. Each memory module may include any system, device or apparatus configured to retain program instructions and/or data for a period of time (e.g., non-transitory computer-readable storage media).

As described in further detail below with reference to FIG. 3, an actuation sensor (not expressly shown) may be coupled to or incorporated within electrical actuator 240. The actuator sensor may detect whether electrical actuator 240 successfully actuated when power is applied to electrical actuator 240, and may transmit a signal to control system 200 indicating whether actuation attempts were successful or not.

Control system 200 may adjust the power level (p) provided to electrical actuator 240 during an attempted actuation based on the number of successes and failures in the past n number of attempted actuations (e.g., 5, 10, 50, 100 actuation attempts). If the number of failed actuations in the past n number of attempts reaches a failure-count threshold, control system 200 may determine that power level (p) is not sufficient to successfully actuate electrical actuator 240 at a desired rate. Accordingly, control system 200 may increase the power level (p) provided to electrical actuators during subsequent actuation attempts. Conversely, if the number of successful actuations in the past n number of attempts reaches a success-count threshold, control system 200 may determine that power level (p) exceeds the level to successfully actuate electrical actuator 240 at a desired rate. Accordingly, control system 200 may lower the power level (p) provided to electrical actuator 240 during subsequent actuation attempts.

The continuous monitoring of failed and successful actuations, and the adjustment of the power level (p) provided to electrical actuator 240 during attempted actuations, may allow for control system 200 to be continuously self-calibrated. For example, control system 200 may self-calibrate to provide electrical actuator 240 with a sufficient, but not excessive, amount of power to actuate. Accordingly, the power in battery 230 may be conserved and the service life of a bottom hole assembly including battery 230 and electrical actuator 240 may be extended.

Figure 3:
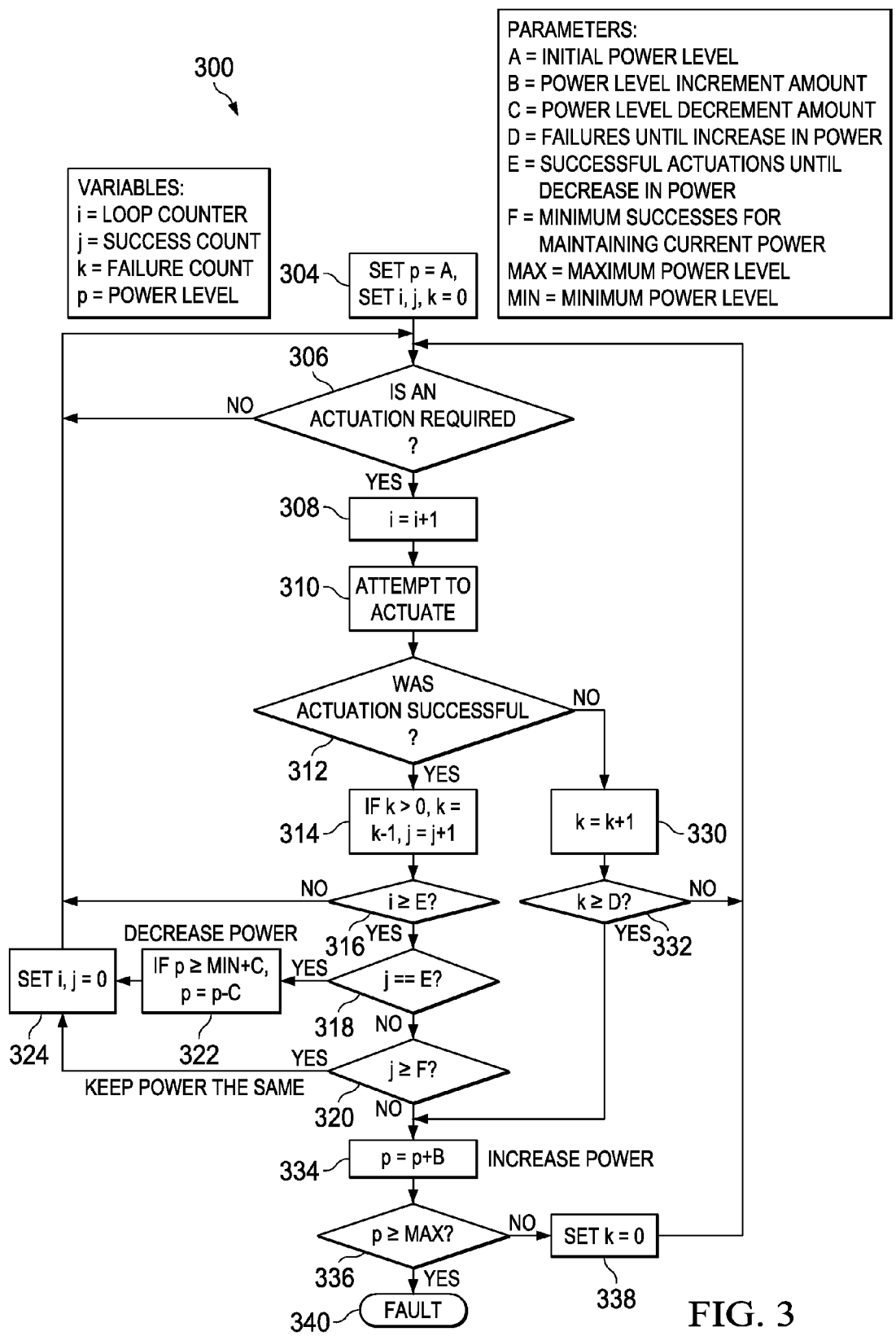
FIG. 3 illustrates a flow chart of an exemplary method for controlling an electrical actuator.

FIG. 3 illustrates a flow chart of an example method 300 for controlling electrical actuator 240. As described above with reference to FIG. 2, the steps for controlling electrical actuator 240 may be performed by control system 200. For example, the steps for controlling electrical actuator may be executed by the processor 212 of controller 210, based on instructions stored within memory 214.

At step 304, the power level (p) may be set to an initial power value (A). The initial power value (A) may be based on an initial estimate of the minimum power required to successfully actuate electrical actuator 240. The minimum power required to successfully actuate an electrical actuator may be a function of environmental conditions such as temperature and/or ambient pressure. Accordingly, the initial estimate of the minimum power required to successfully actuate electrical actuator 240 may be based in part on one or more signals from environmental sensor 220, which, as described above with reference to FIG. 2, may measure environmental parameters such as temperature and/or pressure.

The initial estimate may also be based on physical parameters such as the torque transmitted by an electrical actuator such as an electrically actuated clutch. For example, the amount of torque that may be transmitted through an electrically actuated clutch may depend on the friction between two clutch plates that may be located in an oil-filled clutch encasement. The friction may in turn depend on the power applied to the electrically actuated clutch, as well as the temperature and the pressure within the clutch encasement. Accordingly, the initial estimate of the minimum power required to successfully actuate an electrically actuated clutch may be based on the torque required for a given drilling application, the temperature of the electrically actuated clutch, and/or the pressure within a clutch encasement.

As described in further detail below with reference to steps 308, 314, and 330, the number of attempts to actuate electrical actuator 240 may be counted with a loop counter to determine the number of successful and failed attempts. At step 304, to initiate the count of these items, loop counter (i) may be set to zero, the success count (j) may be set to zero, and the failure count (k) may be set to zero.

At step 306, control system 200 may determine whether an actuation of electrical actuator 240 may be required. If an actuation is not required, control system 200 may repeat step 306. If an actuation is required, control system 200 may proceed to step 308.

At step 308, a value of one (1) may be added to loop counter (i) to record an attempt to actuate electrical actuator 240. At step 310, control system 200 may attempt to actuate electrical actuator 240. For example, control system 200 may drive electrical actuator 240 with the current power level (p) from battery 230.

At step 312, control system 200 may determine whether the attempted actuation of electrical actuator 240 was a success or a failure. For example, a movement (or lack of movement) at electrical actuator 240 may be detected by an actuation sensor coupled to or incorporated within electrical actuator 240, and a feedback signal from electrical actuator 240 may be electrically transmitted to control system 200 indicating whether the attempted actuation was successful.

As described above with reference to step 304, control system 200 may keep running counts of the number of successful and failed actuation attempts. The running counts may consider any number of past attempts to actuate electrical actuator 240. For example, the success count may include the number of successful actuations within the last five, ten, twenty, or any "n" number of attempted actuations. Likewise, the failure count may include the number of failed actuations within the last five, ten, twenty, or any "n" number of attempted actuations.

If, at step 312, control system 200 determines that the actuation attempted during step 310 was successful, control system 200 may proceed to step 314. At step 314, the value one (1) may be added to the success count (j). Further, if the failure count (k) is greater than zero, then the value one (1) may be subtracted from the failure count (k).

At step 316, control system 200 may compare the loop counter (i) to a threshold number of successful actuations (E) for decreasing the power level (p). The threshold number of successful actuations (E) for decreasing the power level (p) may be a threshold that indicates that the power level (p) exceeds the optimized power level for actuating electrical actuator 240. If loop counter (i) is less than the threshold number of successful actuations (E) for decreasing the current power level (p), control system 200 may return to step 306. Alternatively, if loop counter (i) is greater than or equal to the threshold number of successful actuations (E) for decreasing the current power level (p), control system 200 may proceed to step 318.

At step 318, control system 200 may determine whether the success count (j) is equal to the threshold number of successful actuations (E) for decreasing the power level (p).

If, at step 318, the success count (j) is equal to the threshold number of successful actuations (E) for decreasing the power level (p), then control system 200 may proceed to step 322. At step 322, control system 200 may determine whether the power level (p) can be decreased by the decrement amount (C) without the power level being lower than the minimum allowed power level (MIN). If so, the power level decrement amount (C) may be subtracted from power level (p). With a new power level set, control system 200 may reset the loop counter (i) and the success count (j) to zero at step 324 and then return to step 306.

If, at step 318, the success count (j) is not equal to the threshold number of successful actuations (E) for decreasing the power level (p), then control system 200 may proceed to step 320. At step 320, control system 200 may determine whether success count (j) is greater than or equal to the minimum number of successes (F) for maintaining the current power level (p). If the success count (j) is greater than or equal to the minimum number of successes (F) for maintaining the current power level (p), control system 200 may proceed to step 324. At step 324, control system 200 may reset the loop counter (i) and the success count (j) to zero, and then return to step 306.

If at step 320, the success count (j) is less than the minimum number of successes (F) for maintaining the current power level (p), control system 200 may proceed to step 334. Step 334 may also be reached via steps 312, 330, and 332, which are described directly below.

Referring back to step 312, if control system 200 determines that the actuation attempted during step 310 failed, control system 200 may proceed to step 330. At step 330, the value one (1) may be added to failure count (k). Subsequently, at step 332, control system 200 may determine whether the failure count (k) is greater than or equal to the threshold number of failures (D) for increasing the current power level (p). The threshold number of failures (D) for increasing the current power level (p) may be a threshold that indicates that the power level (p) is less than the optimized power level for actuating electrical actuator 240. If the failure count (k) is less than the threshold number of failures (D) for increasing the current power level (p), control system 200 may return to step 306. Alternatively, if the failure count (k) is greater than or equal to the threshold number of failures (D) for increasing the current power level (p), control system 200 may proceed to step 334 where the current power level (p) may be increased.

At step 334, the power level increment amount (B) may be added to the current power level (P). Then, at step 336, control system 200 may determine whether the current power level (p) is greater than the maximum power level (MAX). If current power level (p) is greater than or equal to the maximum power level (MAX), control system 200 may detect a fault condition at step 340. If current power level (p) is less than the maximum power level (MAX), control system 200 may set the failure count (k) to zero and return to step 306.

As described in the steps above, the power level (p) may be adjusted up or down based on, for example, whether the success count (j) is equal to the threshold number of successful actuations (E) for decreasing the power level (p), whether the success count (j) is less than the minimum number of successes (F) for maintaining the current power level (p), or whether the failure count (k) is greater than or equal to the threshold number of failures (D) for increasing the current power level (p). The thresholds E, F, and D, may be set according to a desired calibration settling speed with which control system 200 may calibrate itself. For example, if thresholds E, F, and D are set to lower values (e.g., ten or less), control system 200 may calibrate itself within a smaller number of attempted actuations than if thresholds E, F, and D are set to higher values (e.g., twenty or more).

The calibration settling speed (e.g., the rate at which control system 200 may self-calibrate) may also depend on the power level increment amount (B), and the power level decrement amount (C). For example, larger power level increment and decrement amounts may provide for faster calibration settling speeds. Alternatively, smaller power level increment and decrement amounts may allow control system 200 to more accurately calibrate to an optimized power level (p) for actuating electrical actuator 240. Accordingly, the power level increment amount (B) and the power level decrement amount (C) may be set to values that provide a sufficient balance between calibration settling speeds and calibration accuracy. Further, the values for the power level increment amount (B) and the power level decrement amount (C) may large enough to for the system to quickly settle on a optimal power level (p), but small enough such that control system 200 avoids significantly overshooting the optimal power level (p) in a manner that causes control system 200 to rapidly oscillate between power levels (p) that are too high and too low.

As described above with reference to step 304, the minimum power required to successfully actuate an electrical actuator may be a function of environmental conditions such as temperature and/or ambient pressure. In addition to setting the initial power value (A) based on measured environmental conditions, the power level increment amount (B), and the power level decrement amount (C), may be based in part on one or more signals from environmental sensor 220. Accordingly, the power level increment amount (B), and the power level decrement amount (C) may be based in part on environmental parameters such as temperature and/or ambient pressure. The power level increment amount (B) and the power level decrement amount (C) may also be based on one or more physical parameters. For example, as described above with reference to step 304, the amount of torque that may be transmitted through an electrical actuator such as an electrically actuated clutch may depend on the power applied to the electrically actuated clutch.

Figure 4:
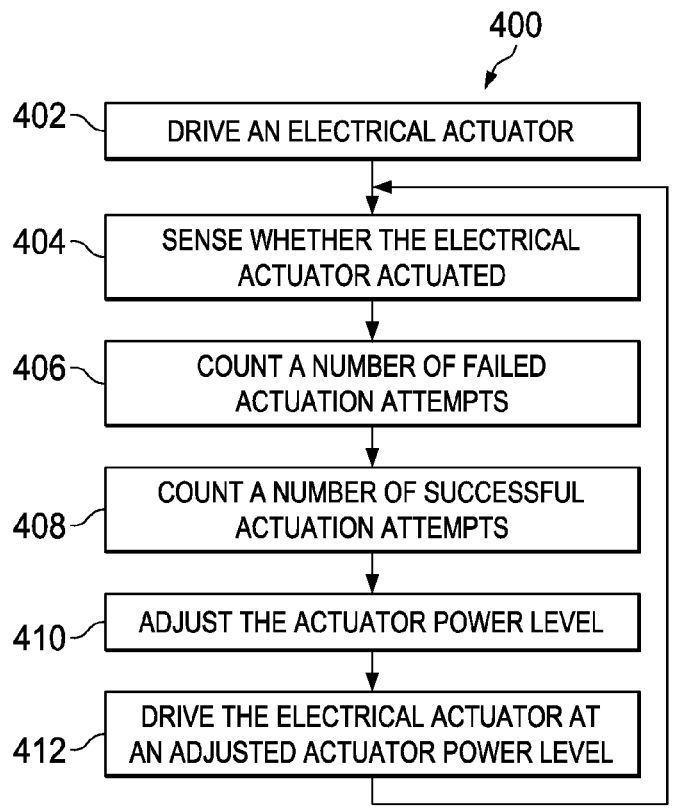
FIG. 4 illustrates a flow chart of an exemplary method for controlling an electrical actuator.

FIG. 4 illustrates a flow chart of an example method 400 for controlling electrical actuator 240. As described above with reference to FIG. 2, the steps for controlling electrical actuator 240 may be performed by control system 200. For example, the steps for controlling electrical actuator 240 may be executed by the processor 212 of controller 210, based on instructions stored within memory 214.

At step 402, an electrical actuator may be driven, multiple times, at a power level. For example, control system 200 may drive electrical actuator 240 at an initial power level (A) during a plurality of actuation attempts.

At step 404, it may be determined whether the electrical actuator successfully actuated for each of the plurality of actuation attempts. For example, controller 210 may receive a signal indicative of whether electrical actuator 240 actuated or not in response to being driven with an initial power level (or any other power level) as described above for step 402, during each of the plurality of actuation attempts.

At step 406, a number of failed actuation attempts may be counted. For example, controller 210 may count the number of failed actuation attempts that occurred during the plurality of actuation attempts occurring at step 402.

At step 408, a number of successful actuation attempts may be counted. For example, controller 210 may count the number of successful actuation attempts that occurred during the plurality of actuation attempts occurring at step 402.

At step 410, the power level may be adjusted. For example, the power level may be increased by the power level increment amount (B) in response to the number of failed actuation attempts reaching a failure-count threshold (e.g., the threshold number of failed actuations (D) for increasing the power level). As another example, the power level may be decreased by the power decrement level amount (C) in response to the number of successful actuation attempts reaching a success-count threshold (e.g., the threshold number of successful actuations (E) for decreasing the power level).

At step 412, the electrical actuator may be driven at an adjusted power level. For example, control system 200 may drive electrical actuator 240 one or more times at the power level that was adjusted during step 410.

Upon completion of step 412, method 400 may return to step 404. For example, steps 404 to 412 may be repeated until the power level has been calibrated to an optimized power level for driving electrical actuator 240. Modifications, additions, or omissions may be made to method 400 without departing from the scope of the disclosure.

In a specific embodiment, elements of which may be used in combination with other embodiments, the disclosure relates to a method of controlling an electrical actuator. The method may include driving an electrical actuator at power level during each of a plurality of actuation attempts, determining whether the electrical actuator actuated during each of the plurality of actuation attempts, counting a number of failed actuation attempts, counting a number of successful actuation attempts, adjusting the power level based on at least one of the number of failed actuation attempts and the number of successful actuation attempts, and driving the electrical actuator at an adjusted power level. The method may also include increasing the power level based on the number of failed actuation attempts reaching a failure-count threshold. Further, the method may include decreasing the power level based on the number of successful actuation attempts reaching a success-count threshold. The method may also include increasing the power level based on the number of successful actuation attempts being less than a threshold number of successful actuation attempts for maintaining the power level. Further, the method may include calibrating the power level to an optimized power level for actuating the electrical actuator. The method may also include implementing a calibration settling speed by setting at least one of a success-count threshold for decreasing the power level, and a failure-count threshold for increasing the power level. Further, the method may include sensing an environmental condition associated with the electrical actuator and adjusting the power level by one of an increment power level and a decrement power level, the increment power level and the decrement power level based on the sensed environmental condition.

In another specific embodiment, elements of which may be used in combination with other embodiments, the disclosure relates to a system for controlling an electrical actuator. The system may include an electrical actuator and a controller electrically coupled to the electrical actuator. The electrical actuator may be configured to drive the electrical actuator at a power level during each of a plurality of actuation attempts, determine whether the electrical actuator actuated during each of the plurality of actuation attempts, count a number of failed actuation attempts, count a number of successful actuation attempts, adjust the power level based on at least one of the number of failed actuation attempts and the number of successful actuation attempts, and drive the electrical actuator at an adjusted power level. The controller may also be configured to increase the power level based on the number of failed actuation attempts reaching a failure-count threshold. Further, the controller may be configured to decrease the power level based on the number of successful actuation attempts reaching a success-count threshold. The controller may also be configured to increase the power level based on the number of successful actuation attempts being less than a threshold number of successful actuation attempts for maintaining the power level. Further, the controller may be configured to calibrate the power level to an optimized power level for actuating the electrical actuator. The controller may also be configured to implement a calibration settling speed by setting at least one of a success-count threshold for decreasing the power level and a failure-count threshold for increasing the power level. Further, the controller may be further configured to sense an environmental condition associated with the electrical actuator and adjust the power level by one of an increment power level and a decrement power level, the increment power level and the decrement power level based on the sensed environmental condition.

In yet another specific embodiment, elements of which may be used in combination with other embodiments, the disclosure relates to a non-transitory machine-readable medium including instructions stored therein, the instructions executable a processor to facilitate performing a method for controlling an electrical actuator. The method may include driving an electrical actuator at power level during each of a plurality of actuation attempts, determining whether the electrical actuator actuated during each of the plurality of actuation attempts, counting a number of failed actuation attempts, counting a number of successful actuation attempts, adjusting the power level based on at least one of the number of failed actuation attempts and the number of successful actuation attempts, and driving the electrical actuator at an adjusted power level. The method may also include increasing the power level based on the number of failed actuation attempts reaching a failure-count threshold. Further, the method may include decreasing the power level based on the number of successful actuation attempts reaching a success-count threshold. The method may also include increasing the power level based on the number of successful actuation attempts being less than a threshold number of successful actuation attempts for maintaining the power level. Further, the method may include calibrating the power level to an optimized power level for actuating the electrical actuator. The method may also include implementing a calibration settling speed by setting at least one of a success-count threshold for decreasing the power level, and a failure-count threshold for increasing the power level. Further, the method may include sensing an environmental condition associated with the electrical actuator and adjusting the power level by one of an increment power level and a decrement power level, the increment power level and the decrement power level based on the sensed environmental condition.

Although the present disclosure has been described with several embodiments, various changes and modifications may be suggested to one skilled in the art. For example, although the present disclosure describes the configurations of cutting elements with respect to drill bits, the same principles may be used to model the efficiency of any suitable drilling tool according to the present disclosure. It is intended that the present disclosure encompasses such changes and modifications as fall within the scope of the appended claims.

What is claimed is:

1. A method of controlling an electrical actuator, comprising:
   driving an electrical actuator at a power level during each of a plurality of actuation attempts;
   determining whether the electrical actuator actuated during each of the plurality of actuation attempts;
   counting a number of failed actuation attempts;
   counting a number of successful actuation attempts;
   adjusting the power level based on at least one of the number of failed actuation attempts and the number of successful actuation attempts;
   calibrating the power level to an optimized power level for actuating the electrical actuator; and
   driving the electrical actuator at a calibrated power level.

2. The method of claim 1, further comprising increasing the power level based on the number of failed actuation attempts reaching a failure-count threshold.

3. The method of claim 1, further comprising decreasing the power level based on the number of successful actuation attempts reaching a success-count threshold.

4. The method of claim 1, further comprising increasing the power level based on the number of successful actuation attempts being less than a threshold number of successful actuation attempts for maintaining the power level.

5. The method of claim 1, further comprising implementing a calibration settling speed by setting at least one of a success-count threshold for decreasing the power level, and a failure-count threshold for increasing the power level.

6. The method of claim 1, further comprising:
   sensing an environmental condition associated with the electrical actuator; and
   adjusting the power level by one of an increment power level and a decrement power level, the increment power level and the decrement power level based on the sensed environmental condition.

7. A system, comprising:
   an electrical actuator; and
   a controller electrically coupled to the electrical actuator and configured to:
     drive the electrical actuator at a power level during each of a plurality of actuation attempts;
     determine whether the electrical actuator actuated during each of the plurality of actuation attempts;
     count a number of failed actuation attempts;
     count a number of successful actuation attempts;
     adjust the power level based on at least one of the number of failed actuation attempts and the number of successful actuation attempts;
     calibrate the power level to an optimized power level for actuating the electrical actuator; and
     drive the electrical actuator at a calibrated power level.

8. The system of claim 7, wherein the controller is configured to increase the power level based on the number of failed actuation attempts reaching a failure-count threshold.

9. The system of claim 7, wherein the controller is configured to decrease the power level based on the number of successful actuation attempts reaching a success-count threshold.

10. The system of claim 7, wherein the controller is configured to increase the power level based on the number of successful actuation attempts being less than a threshold number of successful actuation attempts for maintaining the power level.

11. The system of claim 7, wherein the controller is configured to implement a calibration settling speed by setting at least one of a success-count threshold for decreasing the power level and a failure-count threshold for increasing the power level.

12. The system of claim 7, wherein the controller is configured to:
sense an environmental condition associated with the electrical actuator; and
adjust the power level by one of an increment power level and a decrement power level, the increment power level and the decrement power level based on the sensed environmental condition.

13. A non-transitory machine-readable medium comprising instructions stored therein, the instructions executable by a processor to facilitate performing a method for optimizing the efficiency of a drilling tool, the method comprising:
driving an electrical actuator at a power level during each of a plurality of actuation attempts;
determining whether the electrical actuator actuated during each of the plurality of actuation attempts;
counting a number of failed actuation attempts;
counting a number of successful actuation attempts;
adjusting the power level based on at least one of the number of failed actuation attempts and the number of successful actuation attempts;
calibrating the power level to an optimized power level for actuating the electrical actuator; and
driving the electrical actuator at a calibrated power level.

14. The non-transitory machine-readable medium of claim 13, wherein the method further comprises increasing the power level based on the number of failed actuation attempts reaching a failure-count threshold.

15. The non-transitory machine-readable medium of claim 13, wherein the method further comprises decreasing the power level based on the number of successful actuation attempts reaching a success-count threshold.

16. The non-transitory machine-readable medium of claim 13, wherein the method further comprises implementing a calibration settling speed by setting at least one of a success-count threshold for decreasing the power level and a failure-count threshold for increasing the power level.

17. The non-transitory machine-readable medium of claim 13, wherein the method further comprises:
sensing an environmental condition associated with the electrical actuator; and
adjusting the power level by one of an increment power level and a decrement power level, the increment power level and the decrement power level based on the sensed environmental condition.

* * * * *